(12) United States Patent
Li et al.

(10) Patent No.: US 12,262,032 B2
(45) Date of Patent: Mar. 25, 2025

(54) REINFORCEMENT LEARNING BASED RATE CONTROL

(71) Applicant: Microsoft Technology Licensing, LLC, Redmond, WA (US)

(72) Inventors: Jiahao Li, Beijing (CN); Bin Li, Beijing (CN); Yan Lu, Beijing (CN); Tom W. Holcomb, Sammamish, WA (US); Mei-Hsuan Lu, Taipei (TW); Andrey Mezentsev, Redmond, WA (US); Ming-Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 18/013,240

(22) PCT Filed: Jun. 30, 2020

(86) PCT No.: PCT/CN2020/099390
§ 371 (c)(1),
(2) Date: Dec. 27, 2022

(87) PCT Pub. No.: WO2022/000298
PCT Pub. Date: Jan. 6, 2022

(65) Prior Publication Data
US 2023/0319292 A1    Oct. 5, 2023

(51) Int. Cl.
*H04N 19/196* (2014.01)
(52) U.S. Cl.
CPC .................. *H04N 19/196* (2014.11)
(58) Field of Classification Search
CPC .. H04N 19/196; H04N 19/103; H04N 19/152; H04N 19/17; H04N 19/192;
(Continued)

(56) References Cited

U.S. PATENT DOCUMENTS 7,225,267 B2    5/2007    Key et al.
7,916,783 B2    3/2011    Gao et al.
(Continued)

FOREIGN PATENT DOCUMENTS

CN    108063961    5/2018
CN    108629422    10/2018
(Continued)

OTHER PUBLICATIONS

Communication pursuant to Rules 161(2) and 162 EPC dated Feb. 7, 2023, from European Patent Application No. 20943454.7, 3 pp.
(Continued)

*Primary Examiner* — Susan E. Hodges
(74) *Attorney, Agent, or Firm* — Klarquist Sparkman, LLP (57) ABSTRACT

Implementations of the subject matter described herein provide a solution for rate control based on reinforcement learning. In this solution, an encoding state of a video encoder is determined, the encoding state being associated with encoding of a first video unit by the video encoder. An encoding parameter associated with rate control in the video encoder is determined by a reinforcement learning model and based on the encoding state of the video encoder. A second video unit different from the first video unit is encoded based on the encoding parameter. In this way, it is possible to achieve a better quality of experience (QOE) for real time communication with computation overhead being reduced.

20 Claims, 4 Drawing Sheets

(58) Field of Classification Search
CPC .. H04N 19/147; H04N 19/124; H04N 19/184; G06N 3/006; G06N 3/044; G06N 3/0442; G06N 3/092; G06N 3/08; G06T 9/002; G06T 2207/20084
USPC ........................................................ 375/240
See application file for complete search history.

(56) References Cited

U.S. PATENT DOCUMENTS

| | | | |
|---|---|---|---|
| 9,679,258 | B2 | 6/2017 | Mnih et al. |
| 10,341,670 | B1 | 7/2019 | Brailovskiy et al. |
| 11,330,333 | B2* | 5/2022 | Puente .................. H04N 21/222 |
| 2006/0192850 | A1 | 8/2006 | Verhaegh et al. |
| 2007/0025441 | A1 | 2/2007 | Ugur et al. |
| 2014/0115100 | A1* | 4/2014 | Changuel .......... H04W 28/0231 709/217 |
| 2014/0240319 | A1 | 8/2014 | Yasser |
| 2016/0019303 | A1 | 1/2016 | Littleford |
| 2021/0012227 | A1* | 1/2021 | Fang .................. H04L 41/5067 |

FOREIGN PATENT DOCUMENTS

| | | |
|---|---|---|
| CN | 109769119 | 5/2019 |
| CN | 111031387 | 4/2020 |
| JP | 2001-231039 | 8/2001 |
| JP | 2006-524461 | 10/2006 |
| RU | 2579967 | 4/2016 |
| WO | WO 2019/104635 | 6/2019 |
| WO | WO 2019/117970 | 6/2019 |
| WO | WO 2020/112321 | 6/2020 |

OTHER PUBLICATIONS

Communication pursuant to Rules 70(2) and 70a(2) EPC dated Mar. 11, 2024, from European Patent Application No. 20943454.7, 1 p.

Extended European Search Report dated Feb. 20, 2024, from European Patent Application No. 20943454.7, 10 pp.

Guo et al., "A Bayesian Approach to Block Structure Inference in AV1-based Multi-rate Video Encoding," *2018 Data Compression Conference.* pp. 383-392 (Mar. 2018).

Guo et al., "Rate Control for Screen Content Coding Based on Picture Classification," *IEEE Visual Communications and Image Processing*, 4 pp. (Dec. 2015).

Guo et al., "Rate Control for Screen Content Coding in HEVC," *IEEE Int'l Symp. on Circuits and Systems*, pp. 1118-1121 (May 2015).

Helle et al., "Reinforcement Learning for Video Encoder Control in HEVC," *Int'l Conf. on Systems, Signals and Image Processing*, 5 pp. (May 2017).

Hu et al., "Reinforcement Learning for HEVC/H.265 Intra-Frame Rate Control," *IEEE Int'l Symp. on Circuits and Systems*, 5 pp. (May 2018).

Huang et al., "QARC: Video Quality Aware Rate Control for Real-Time Video Streaming via Deep Reinforcement Learning," *26th ACM Int'l Conf. on Multimedia*, 10 pp. (Oct. 2018).

Li et al., "A Convolutional Neural Network-Based Approach to Rate Control in HEVC Intra Coding," *IEEE Visual Communications and Image Processing*, 4 pp. (Dec. 2017).

Official Action dated Nov. 8, 2023, from Russian Patent Application No. 2022133819, 18 pp.

Rippel et al., "Learned Video Compression," *Journal of Computing Research Repository*, pp. 3454-3463 (Nov. 2018).

Schulman et al., "Proximal Policy Optimization Algorithms," arXiv:1707.06347v2, 12 pp. (Aug. 2017).

Tang et al., "Down-Sampling Based Rate Control for Mobile Screen Video Coding," *IEEE Access*, vol. 7, pp. 139560-139570 (Sep. 2019).

Zhang et al., "A New Rate Control Scheme for Video Coding Based on Region of Interest," *IEEE Access*, vol. 5, pp. 13677-13688 (Mar. 2017).

Zheng et al., "Lightweight Content-Adaptive Coding in Joing Nalyzing-Encoding Framework," *IEEE Trans. on Consumer Electronics*, vol. 54, No. 2, pp. 614-622 (May 2008).

Zhou et al., "Rate Control Method Based on Deep Reinforcement Learning for Dynamic Video Sequences in Hevc," *IEEE Trans. on Multimedia*, vol. 23, pp. 1106-1121 (May 2020).

Zhu et al., "Low-Complexity Reinforcement Learning for Delay-Sensitive Compression in Networked Video Stream Mining," *IEEE Int'l Conf. on Multimedia and Expo*, 6 pp. (Jul. 2013).

Office Action dated Feb. 2, 2024, from South African Patent Application No. 2022/11950, 1 p.

Official Action dated Mar. 28, 2024, from Russian Patent Application No. 2022133819, 10 pp.

Cheng et al., "Adaptive Video Transmission Control System Based on Reinforcement Learning Approach Over Heterogeneous Networks," *IEEE Trans. on Automation Science and Engineering*, vol. 12, No. 3, pp. 1104-1112 (Jul. 2015).

International Search Report and Written Opinion dated Mar. 31, 2021, from International Patent Application No. PCT/CN2020/099390, 7 pp.

Kan, "Deep Reinforcement Learning-Based Rate Adaptation for Adaptive 360-Degree Video Streaming," *IEEE Int'l Conf. on Acoustics, Speech and Signal Processing*, pp. 4030-4034 (Dec. 2019).

Decision to Grant dated Aug. 1, 2024, from Russian Patent Application No. 2022133819, 17 pp.

Notice of Reasons for Refusal dated May 7, 2024, from Japanese Patent Application No. 2022-581327, 10 pp.

Notice of Reasons for Refusal dated Oct. 1, 2024, from Japanese Patent Application No. 2022-581327, 6 pp.

\* cited by examiner

REINFORCEMENT LEARNING BASED RATE CONTROL

CROSS REFERENCE TO RELATED APPLICATIONS

This is the U.S. National Stage of International Application No. PCT/CN2020/099390, filed Jun. 30, 2020, which was published in English under PCT Article 21(2), and which is incorporated by reference herein in its entirety.

BACKGROUND

In real time communication (RTC), a common demand is screen sharing with different users. For example, a participant may need to present his or her desktop screen to other participants in multi-user video conferencing. In this scenario, a technology goal is to offer better quality of experience (QOE), which is often determined by various factors such as visual quality, drop rate, transmission delay, and so on. Rate control plays a key role to achieve this goal through determining encoding parameters for a video encoder to achieve a target bitrate.

Existing rate control methods are mainly designed for videos with natural scenes. However, different from natural videos, which are most with smooth content motion, screen content is usually interlaced with complex sudden change and stationary scene. Because of this unique motion characteristic, existing rate control methods designed for natural videos cannot work well for screen content.

SUMMARY

In accordance with implementations of the subject matter described herein, there is provided a solution for rate control based on reinforcement learning. In this solution, an encoding state of a video encoder is determined, the encoding state being associated with encoding of a first video unit by the video encoder. An encoding parameter associated with rate control in the video encoder is determining by a reinforcement learning model and based on the encoding state of the video encoder. A second video unit different from the first video unit is encoded based on the encoding parameter. The reinforcement learning model is configured to receive the encoding state of one or more video units to determine an encoding parameter for use in another video unit. The encoding state has a limited state dimension and it is possible to achieve a better QOE for real time communication with computation overhead being reduced.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Through the more detailed description of some implementations of the subject matter described herein in the accompanying drawings, the above and other objects, features and advantages of the subject matter described herein will become more apparent, wherein.

Throughout the drawings, the same or similar reference numerals represent the same or similar element.

DETAILED DESCRIPTION

The subject matter described herein will now be discussed with reference to several example implementations. It is to be understood these implementations are discussed only for the purpose of enabling those skilled persons in the art to better understand and thus implement the subject matter described herein, rather than suggesting any limitations on the scope of the subject matter.

As used herein, the term "includes" and its variants are to be read as open terms that mean "includes, but is not limited to." The term "based on" is to be read as "based at least in part on." The terms "one implementation" and "an implementation" are to be read as "at least one implementation." The term "another implementation" is to be read as "at least one other implementation." The terms "first," "second," and the like may refer to different or same objects. Other definitions, either explicit or implicit, may be included below.

Figure 1:
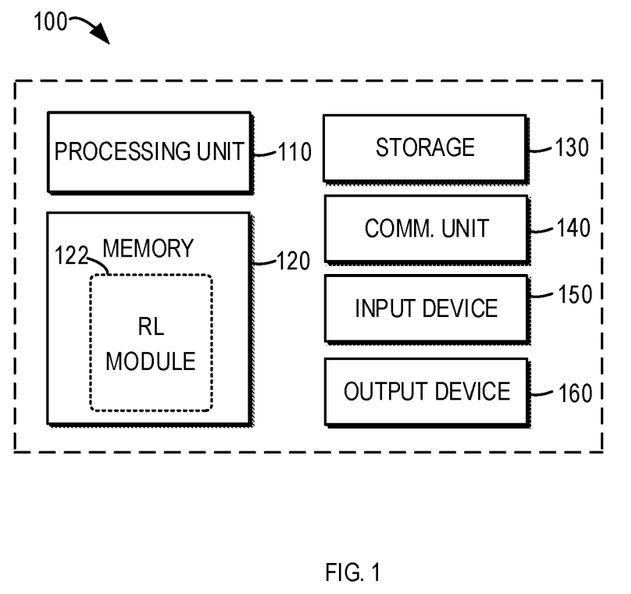
FIG. 1 illustrates a block diagram of a computing device in which various implementations of the subject matter described herein can be implemented.

FIG. 1 illustrates a block diagram of a computing device 100 in which various implementations of the subject matter described herein can be implemented. It would be appreciated that the computing device 100 shown in FIG. 1 is merely for purpose of illustration, without suggesting any limitation to the functions and scopes of the implementations of the subject matter described herein in any manner. As shown in FIG. 1, the computing device 100 includes a general-purpose computing device 100. Components of the computing device 100 may include, but are not limited to, one or more processors or processing units 110, a memory 120, a storage device 130, one or more communication units 140, one or more input devices 150, and one or more output devices 160.

In some implementations, the computing device 100 may be implemented as any user terminal or server terminal having the computing capability. The server terminal may be a server, a large-scale computing device or the like that is provided by a service provider. The user terminal may for example be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, television receiver, radio broadcast receiver, E-book device, gaming device, or any combination thereof, including the accessories and peripherals of these devices, or any combination thereof. It would be contemplated that the computing device 100 can support any type of interface to a user (such as "wearable" circuitry and the like).

The processing unit 110 may be a physical or virtual processor and can implement various processes based on programs stored in the memory 120. In a multi-processor system, multiple processing units execute computer executable instructions in parallel so as to improve the parallel processing capability of the computing device 100. The processing unit 110 may also be referred to as a central processing unit (CPU), a microprocessor, a controller or a microcontroller.

The computing device 100 typically includes various computer storage medium. Such medium can be any medium accessible by the computing device 100, including, but not limited to, volatile and non-volatile medium, or detachable and non-detachable medium. The memory 120 can be a volatile memory (for example, a register, cache, Random Access Memory (RAM)), a non-volatile memory (such as a Read-Only Memory (ROM), Electrically Erasable Programmable Read-Only Memory (EEPROM), or a flash memory), or any combination thereof. The storage device 130 may be any detachable or non-detachable medium and may include a machine-readable medium such as a memory, flash memory drive, magnetic disk or another other media, which can be used for storing information and/or data and can be accessed in the computing device 100.

The computing device 100 may further include additional detachable/non-detachable, volatile/non-volatile memory medium. Although not shown in FIG. 1, it is possible to provide a magnetic disk drive for reading from and/or writing into a detachable and non-volatile magnetic disk and an optical disk drive for reading from and/or writing into a detachable non-volatile optical disk. In such cases, each drive may be connected to a bus (not shown) via one or more data medium interfaces.

The communication unit 140 communicates with a further computing device via the communication medium. In addition, the functions of the components in the computing device 100 can be implemented by a single computing cluster or multiple computing machines that can communicate via communication connections. Therefore, the computing device 100 can operate in a networked environment using a logical connection with one or more other servers, networked personal computers (PCs) or further general network nodes.

The input device 150 may be one or more of a variety of input devices, such as a mouse, keyboard, tracking ball, voice-input device, and the like. The output device 160 may be one or more of a variety of output devices, such as a display, loudspeaker, printer, and the like. By means of the communication unit 140, the computing device 100 can further communicate with one or more external devices (not shown) such as the storage devices and display device, with one or more devices enabling the user to interact with the computing device 100, or any devices (such as a network card, a modem and the like) enabling the computing device 100 to communicate with one or more other computing devices, if required. Such communication can be performed via input/output (UO) interfaces (not shown).

In some implementations, as an alternative of being integrated in a single device, some or all components of the computing device 100 may also be arranged in cloud computing architecture. In the cloud computing architecture, the components may be provided remotely and work together to implement the functionalities described in the subject matter described herein. In some implementations, cloud computing provides computing, software, data access and storage service, which will not require end users to be aware of the physical locations or configurations of the systems or hardware providing these services. In various implementations, the cloud computing provides the services via a wide area network (such as Internet) using suitable protocols. For example, a cloud computing provider provides applications over the wide area network, which can be accessed through a web browser or any other computing components. The software or components of the cloud computing architecture and corresponding data may be stored on a server at a remote position. The computing resources in the cloud computing environment may be merged or distributed at locations in a remote data center. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or installed directly or otherwise on a client device.

The computing device 100 may be used to implement reinforcement learning based rate control in implementations of the subject matter described herein. The memory 120 may include one or more reinforcement learning modules 122 having one or more program instructions. These modules are accessible and executable by the processing unit 110 to perform the functionalities of the various implementations described herein. For example, the input device 150 may provide a video or a sequence of frames of the environment of the computing device 100 to the reinforcement learning module 122 to enable video conferencing application, while the processing unit 110 and/or the memory 120 may provide at least a part of screen content to the reinforcement learning module 122 to enable screen content sharing application. The multimedia content can be encoded by the reinforcement learning module 122 to achieve rate control with a good QOE.

Figure 2:
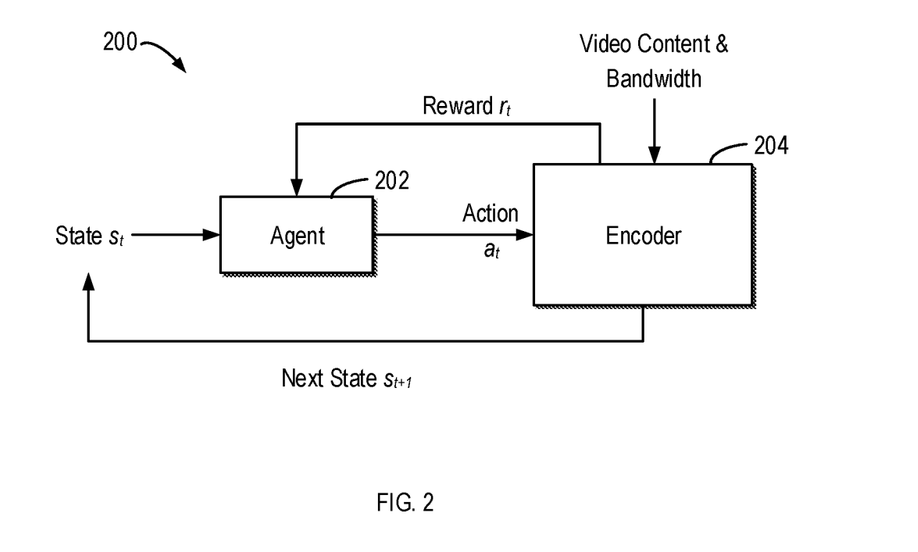
FIG. 2 illustrates a block diagram of a reinforcement learning module according to an implementation of the subject matter described herein.

Reference now is made to FIG. 2, which shows a block diagram of a reinforcement learning module 200 in accordance with implementations described herein. The reinforcement learning module 200 may be implemented in the computing device 100 as the reinforcement module 122, for example. The reinforcement learning module 200 includes an encoder 204 configured to encode multimedia content from other components of the computing device 100, for example, the processing unit 110, memory 120, storage 130, input device 150 and/or the like. For example, the input device 150 may provide one or more frames of a video to the reinforcement learning module 200 while the processing unit 110 and/or the memory 120 may provide at least a part of screen content to the reinforcement learning module 200. For example, the encoder 204 may be a video encoder, especially a video encoder optimized for screen content from the computing device 100.

Encoding parameter associated with rate control such as the quantization parameter (QP) or lambda controls the granularity of compression for a video unit, e.g. a frame, a block or Macroblock in a frame. Large values mean that there will be higher quantization, more compression, and lower quality. Lower values mean the opposite. It is, therefore, possible to achieve a good QOE by performing rate control to adjust the encoding parameter, e.g. the quantization parameter or lambda, of the encoder. Although reference is now made to the quantization parameter or lambda, it is noted that the quantization parameter or lambda are provided for illustrative purpose and any other suitable encoding parameters associated with rate control can be adjusted or controlled.

As shown in FIG. 2, the reinforcement learning module 200 may include an agent 202 configured to make decision controlling the encoding parameter of the encoder 204. In some implementations, the agent 202 may adopt a reinforcement learning model implemented by a neural network, for example, a recurrent neural network.

The encoded bitstream is then output to a transmission buffer. The encoder 204 may also include such a transmission buffer (not shown) to implement the bitstream sending process. After being encoded, the bitstream of the recently encoded video unit will be stored or added into the transmission buffer. During transmission, the bitstream stored in the transmission buffer is transmitted through one or more channels at a bandwidth to one or more receivers and the transmitted bitstream will be removed from the buffer at the bandwidth along with the transmission. The state of the transmission buffer is in a constant process of changing because of ingoing and outgoing bitstreams into and out of the transmission buffer.

At each time step t, the agent 202 observes the encoding state $s_t$ of the encoder 204. The encoding state $s_t$ at time step t may be determined based on the encoding of at least a video unit at time step t−1. Based on this input information, the agent 202 makes inference and outputs an action at. The action at indicates how fine the encoder 204 should compress a video unit at time step t. The action at may be the encoding parameter, e.g. quantization parameter (QP), of the encoder 204 for rate control or can be mapped to the encoding parameter of the encoder 204. After obtaining the encoding parameter, the encoder 204 can begin to encode a video unit, for example, a screen content frame. The encoding of the video unit at time step t will then be used to update the encoding state $s_{t+1}$ the agent 202 at time step t+1. It is to be understood that the reinforcement learning module 200 can be applied to any other suitable multimedia application than the real time screen content sharing.

By controlling the encoding parameter by the action of the agent based on the encoding state of the encoder rather than traditional hand-crafted rules, the reinforcement learning based solution in accordance with implementations of the subject matter described herein can achieve better visual quality with negligible drop rate change. The encoding state of the encoder has a limited state space, thus allows the decision of the encoding parameter to be made with reduced computation overhead and improved efficiency. In particular, when sudden scene change happens in screen content, the well-trained reinforcement learning model can update the encoding parameter very fast to achieve a better QOE, which is particularly beneficial for screen content sharing in real-time communication. The reinforcement learning based architecture is not limited to any codecs and can cooperate with various different codecs, for example, H.264, HEVC, and AV1.

In some implementations, to help the agent 202 of the reinforcement learning module 200 make correct and reliable decisions, the encoding state $s_t$ at time step t as the input to the agent 202 may include a number of elements to represent the encoding state from various perspective. For example, a video unit may be a frame and the encoding state $s_t$ may include a state representing an outcome for encoding at least the frame at time step t−1, a state of the transmission buffer at time step t, and a state associated with a status of a network at time step t for transmitting the encoded frames.

For example, the outcome for encoding at least the frame at time step t−1 may further include the outcome for encoding the frames prior to time step t−1, for example, the frame at time step t−2. In an example, the outcome may include the encoding parameter, e.g. QP or lambda, of the encoded frame at time step t−1 and the size of the encoded frame at time step t−1. If the frame is dropped, the encoding parameter of the encoded frame at time step t−1 may be set to a predefined value such as zero. In an example, the frame size at time step t−1 may be represented by a frame size ratio of the frame, which is defined by the ratio of the frame size to an average target frame size. In other words, the frame size at time step t−1 may be normalized by the average target frame size. For example, the frame size may be represented by the bitstream size of the frame, and the average target frame size may represent an average of the target number of bits in the frame and may be calculated by dividing the target bitrate by the frame rate. The target bitrate represents the target number of bits to be transmitted and the frame rate represents the frequency or rate for transmitting the frames. Both the target bitrate and the frame rate can be determined from the video encoder.

In an example, the state of the transmission buffer may include the usage of the buffer, for example, a ratio of an occupied space to maximum space of the buffer, remaining space of the buffer measured in frames, or its combination. The remaining space of the buffer measured in frames may be calculated by dividing the remaining space of the buffer by the average target frame size. This value describes the buffer usage from another aspect, where the influence of frame rate is considered.

In an example, the state associated with the network status includes a target bits per pixel (BPP). This parameter is defined by the number of bits used by a pixel and may be calculated by dividing the target bitrate by the number of pixels in a frame per unit of time. The target bitrate and the number of pixels in a frame can be determined from the video encoder, for example.

In some implementations, the encoding state as described above is with respect to a frame and the reinforcement learning module 200 makes the decision on frame basis. In other implementations, the reinforcement module 200 may be applied or adapted to any other suitable video unit for compression or encoding. For example, the reinforcement module may make decision at block level, e.g., macroblock (H.264), coding tree unit (HEVC), superblock (AV1), or the like. Accordingly, the encoding state $s_t$ used as the input to the agent 202 may include a state representing an outcome for encoding at least one block at time step t−1, a state of the transmission buffer at time step t, and a state associated with a status of a network at time step t for transmitting the encoded blocks.

For example, the outcome for encoding at least one block may include the outcome for encoding one or more neighbor blocks. The neighbor blocks may include a block spatially on the left, right, top, and/or bottom of the block being processed. The encoding of the spatially neighboring blocks may be performed at the time step t−1 or other prior time steps. The encoding outcome of the spatially neighboring blocks may be stored in a storage and the encoding outcome of the spatially neighboring blocks may be retrieved from the storage. Additionally or alternatively, the neighbor blocks may include one or more corresponding blocks at previous frames, which is also referred to as temporally neighboring blocks. The encoding outcome of the temporally neighboring blocks may be stored and retrieved from the storage.

In an example, the outcome may include the encoding parameter, e.g. QP or lambda, of the encoded at least one block and the size of the encoded at least one block. For example, the size of the encoded block may be represented by a block size ratio, which is defined by the ratio of the size of the encoded block to an average target block size. In other words, the block size can be normalized by the average target block size. For example, the block size may be represented by the bitstream size for encoding the block, and the average target block size may represent an average of the target number of bits in the block and may be calculated by dividing the target bitrate by the number of blocks being transmitted per unit of time.

In an example, the state of the transmission buffer may include the usage of the buffer, for example, a ratio of an occupied space to maximum space of the buffer, remaining space of the buffer measured in blocks, or its combination. The remaining space of the buffer measured in blocks may be calculated by dividing the remaining space of the buffer by the average target block size.

In an example, the state associated with the network status includes a target bits per pixel (BPP). This parameter is defined by the number of bits used by a pixel and can be calculated similarly to the implementations with respect to frames.

The encoding state has been described with respect to the encoding parameter such as a quantization parameter or lambda. It is noted that the encoding state may also be applied to any other suitable encoding parameters associated with rate control used by the encoder.

Referring back to FIG. 2, the action $a_t$ output by the agent 202 can control encoding quality of the encoder 204. For example, the action at determined by the agent 202 may be normalized and range from 0 to 1. In some implementations, the action can be mapped into QP that the encoder can understand. For example, the mapping may be implemented by:

$$QP_{cur} = QP_{min} + (QP_{max} - QP_{min}) * \text{action} \quad (1)$$

where $QP_{max}$ and $QP_{min}$ represent the maximum and minimum QP, respectively, and $QP_{cur}$ represents the QP to be used for encoding by the encoder 204. Although this mapping function is exemplified as a linear function, it is to be understood that any other suitable function can be used instead. A smaller QP value makes the encoder perform the compression in a finer way and obtain a higher reconstruction quality. However, the cost is that it generates a larger encoded bitstream. Too large bitstream makes the buffer easily overshoot and a frame may be dropped (e.g. for frame level rate control) accordingly. On the other hand, a larger QP value takes a coarser encoding, but a smaller encoded bitstream will be generated.

In some further implementations, the encoding parameter may be implemented as lambda. The action at output by the agent 202 can then be mapped into lambda that the encoder can understand. For example, the mapping may be implemented by:

$$\text{lambda}_{cur} = e^{ln(\text{lambda}_{min}) + (ln(\text{lambda}_{max}) - ln(\text{lambda}_{min})) + \text{action}} \quad (2)$$

where $\text{lambda}_{max}$ and $\text{lambda}_{min}$ represent the maximum and minimum lambda, respectively, and $\text{lambda}_{cur}$ represents the lambda to be used by the encoder 204. This mapping function is linearly conducted in logarithmic domain of lambda. In addition or alternative to the mapping function as showed above, any other suitable function can be used for the mapping instead. A lower lambda value controls the encoding in a finer way and obtains a higher reconstruction quality. However, it may result in a larger encoded bitstream and the buffer may be easily overshoot, while a higher lambda value takes a coarser encoding, but a smaller encoded bitstream will be generated.

Still referring to FIG. 2, in training the reinforcement learning module 200, it is necessary to evaluate how good the action made by agent 202 is. To this end, a reward $r_t$ is provided after the encoder 204 finishes encoding each video unit with the action $a_t$. The agent 202 may update its policy based on the reward $r_t$ when the agent 202 obtains an amount of training samples. The agent 202 can be trained to converge towards the direction that can maximize the accumulated reward. In order to obtain a better QOE, one or more factors reflecting the QOE can be incorporated into the reward. For example, the reward $r_t$ is configured to penalize buffer overshooting and to increase as the encoding parameter results in a higher visual quality. For example, the visual quality increases as the quantization parameter or lambda decreases.

In an example, the reward $r_t$ may be calculated by:

$$r_{base} = \begin{cases} a*(QP_{max} - QP_{cur}), & \text{Non\_BufferOvershoot} \\ b, & \text{BufferOvershoot} \end{cases}$$

$$r_{base} = \begin{cases} a*(ln(\text{lambda}_{max}) - ln(\text{lambda}_{cur})), & \text{Non\_BufferOvershoot} \\ b, & \text{BufferOvershoot} \end{cases} \quad (3)$$

$$r_{final} = \left(1 + \frac{\text{Bandwidth}_{cur}}{\text{Bandwidth}_{max}}\right) * r_{base} \quad (4)$$

where a is a constant factor, b is a negative number, $r_{base}$ represents a base reward, $\text{Bandwidth}_{cur}$ represents the bandwidth of the channel for transmitting the bitstream at time step t, $\text{Bandwidth}_{max}$ represents the maximum bandwidth, and $r_{final}$ represents the final reward.

The base reward $r_{base}$ is calculated by Equation (3). For example, higher visual quality can bring better QOE, especially in screen content sharing scenario. Therefore, it is desirable to use smaller QP or lambda to achieve higher visual quality, and the reward increases as the current quantization parameter $QP_{cur}$ decreases as shown in Equation (3). However, a very small QP value may also result in a large bitstream size, which could easily lead to buffer overshooting and consequently frame dropping for frame-level rate control. Therefore, the reward is set as a negative number (namely b) for buffer overshooting. Setting the negative number as a penalty is used to train the agent 202 to avoid the buffer overshooting.

After calculating $r_{base}$, the final reward $r_{final}$ can be obtained by scaling $r_{base}$, as shown in Equation (4), for example. The scaling factor is related to the ratio of the bandwidth at time step t to maximum bandwidth. When the bandwidth at time step t is high, the reward $r_t$ is scaled to a larger value, and the penalty will also be larger if buffer overshooting occurs. It can be more aggressive to pursue better visual quality under high bandwidth condition and, on the other hand, it is more serious for buffer overshooting to occur. It is noted that any other suitable function can be used instead to calculate the reward without departing from the spirit of the implementations described herein.

In some implementations, Proximal Policy Optimization (PPO) algorithm may be adopted to train the agent 202 based on the reward $r_t$. PPO is implemented based on actor-critic architecture, which includes an actor network for an actor and a critic network for a critic. The actor acts as the agent 202. The input to the actor network is the encoding state and the output of the actor network is the action. The actor network is configured to estimate a policy $\pi_\theta(a_t/s_t)$, where $\theta$ represents policy parameters (for example, the weights in the actor network), and $a_t$ and $s_t$ represent the action and the encoding state at time step t, respectively. The critic network of the critic is configured to evaluate how good the encoding state $s_t$ is, and only works during the training process.

In the PPO algorithm, a policy loss $L_{policy}$ may be used for updating the actor and a value loss $L_{value}$ may be used for updating the critic as follows:

$$L_{value} = \left[\sum\nolimits_{i=t}^{\infty} \gamma^{i-t} r_i - V_\theta(s_t)\right]^2 \quad (5)$$

$$L_{policy} = \min\left(\frac{\pi_\theta(a_t \mid s_t)}{\pi_{\theta_{old}}(a_t \mid s_t)} A_t, \text{clip}\left(\frac{\pi_\theta(a_t \mid s_t)}{\pi_{\theta_{old}}(a_t \mid s_t)}, 1-\epsilon, 1+\epsilon\right) A_t\right) \quad (6)$$

where the value loss is calculated as the square of $\sum_{i=t}^{\infty} \gamma^{i-t} r_i - V_\theta(s_t)$, $\gamma^{i-t} r_i$ is the discounted reward ($\gamma$ represents the discount), $V_\theta(s_t)$ is the evaluation value generated by the critic for the input encoding state $s_t$, and $V_\theta$ represents the value function. In reinforcement learning, the value function represents how good the state of the agent is. $A_t$ represents an estimator of the advantage function at time step t and is calculated as $\sum_{i=t}^{\infty} \gamma^{i-t} r_i V_\theta(s_t)$, i.e., the difference between the given state-action pair and the value function of the state of the agent. $\theta$ represents stochastic policy parameters and $\theta_{old}$ represents the policy parameters before the update. Clip ( ) represents a clip function and E represents a hyperparameter. It is noted that any suitable change can be applied to the loss functions.

The encoding state used in the reinforcement learning module 200 enables a lightweight network architecture for the agent 202 and also a lightweight network architecture to train the agent 202. For example, a neural network implementing the agent 202 may include one or more input fully connected layers configured to extract features from the encoding state $s_t$. The extracted features may be provided to one or more recurrent neural networks to extract temporal features or correlation from the features. Then, the features may be provided to one or more output fully connected layers to make a decision, for example, to generate the action at. The recurrent neural network may be a gated recurrent unit or long-short term memory (LSTM), for example. The neural network has a lightweight but efficient architecture to meet the demand of the real time application, in particular, screen content coding (SCC).

Figure 3:
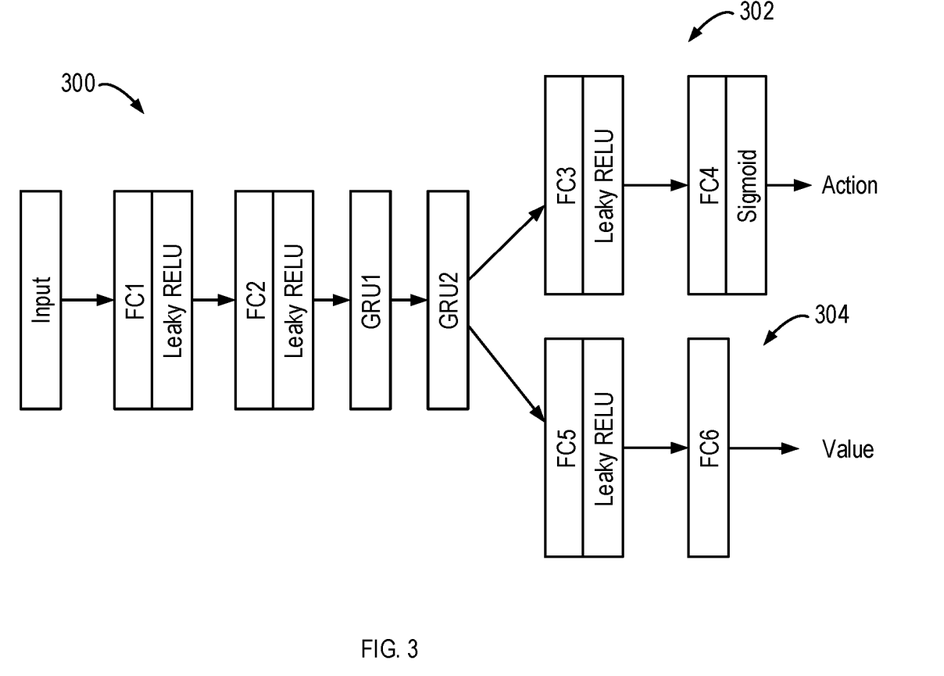
FIG. 3 illustrates an example of an agent for use in the reinforcement learning module according to an implementation of the subject matter described herein.

FIG. 3 illustrates an example of a neural network 300 for training the agent 202 according to an implementation of the subject matter described herein. The neural network 300 includes an actor network 302 and a critic network 304. The actor network 302 and the critic network 304 may share common network modules to reduce the parameters to be optimized. In this example, the input will pass two fully connected (FC) layers and be transformed into a feature vector. It is to be understood that any suitable activation functions may be used in the network, although a leaky Rectified Linear Unit (RELU) is illustrated in FIG. 3.

Considering that the rate control is a time-series problem, two gated recurrent units (GRUs) are introduced to further extract the feature combining with history information. It is to be understood that any other suitable recurrent neural networks can be used as well. After the GRUs, the actor and critic networks begin to have individual network modules. Both the actor and critic will reduce the dimension of feature vector with a FC layer, respectively. Finally, both networks use one FC layer to generate their respective outputs and a sigmoid layer is used in the actor network to normalize the range of the action to [0, 1]. It is to be understood that any suitable activation function can be used in replace of the sigmoid function.

The neural network 300 has a lightweight but efficient architecture to meet the demand of the real time application. For screen content coding (SCC), the reinforcement learning based solution can achieve better visual quality with negligible drop rate change when compared with traditional ruled based rate control method. In particular, this method can bring much faster quality refreshment after sudden scene change happens in screen content. The reinforcement network based architecture is not limited to any codecs and can cooperate with various different codecs, for example, H.264, HEVC, and AV1.

Figure 4:
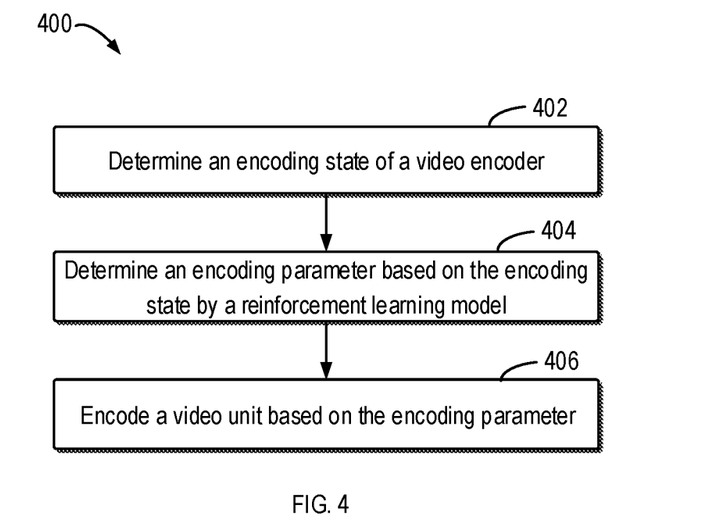
FIG. 4 illustrates a flowchart of a method for reinforcement learning based rate control according to an implementation of the subject matter described herein.

FIG. 4 illustrates a flowchart of a method 400 for reinforcement learning based rate control according to an implementation of the subject matter described herein. The method 400 may be implemented by the computing device 100, for example, by the reinforcement learning module 122 in the computing device 100. The method 400 may also be implemented by any other devices, a cluster of devices, or a distributed parallel system similar to the computing device 100. For purpose of description, the method 400 is described with reference to FIG. 1.

At block 402, the computing device 100 determines an encoding state of a video encoder. The encoding state may be associated with encoding a first video unit by the video encoder. The video encoder may be configured to encode screen content for real-time communication. For example, the video encoder may be the encoder 204 as in the reinforcement learning module 200, as shown in FIG. 2. The encoding state associated with encoding the first video unit comprises: a state representing an outcome for encoding at least the first video unit; a state of a buffer configured to buffer video units encoded by the video encoder before transmission; and a state associated with a status of a network for transmitting the encoded video units. A video unit may include a frame, a block, or Macroblock in a frame. In some implementations, the outcome for encoding the first video unit comprises the encoding parameter of the encoded first video unit and a size of the encoded first video unit, the state of the buffer comprises the usage of the buffer, and the state associated with the status of the network comprises a target bits per pixel. In some implementations, the usage of the buffer comprises at least one of: a ratio of an occupied space to maximum space of the buffer; and remaining space of the buffer measured in video units.

At block 404, the computing device 100 determines, by a reinforcement learning model and based on the encoding state of the video encoder, an encoding parameter associated with rate control for the video encoder. The encoding parameter may be a quantization parameter or lambda. In some implementations, the encoding parameter is determined based on an action output by an agent based on the encoding state of the video encoder. The agent may comprise a neural network implementing the reinforcement learning model, and the action output by the agent is mapped to the encoding parameter.

At block 406, the computing device 100 encodes a second video unit different from the first video unit based on the encoding parameter. The first video unit may be a first frame and the second video unit can be a second frame subsequent to the first frame. Alternatively, the first video unit may be a first block and the second video unit may be a neighboring second block, for example, a spatially neighboring block or a temporal neighboring block.

In some implementations, the reinforcement learning model is trained by: determining a reward for the encoding parameter based on the encoding of the second video unit, wherein the reward is configured to penalize buffer overshooting and to increase as the encoding parameter results in a higher visual quality.

In some implementations, the reward comprises: determining a base reward in such a way that the base reward has a negative value if buffer overshooting occurs and the base reward is proportional to the encoding parameter by a negative coefficient if the buffer overshooting does not occur; and scaling the base reward by a scaling factor to obtain the reward, wherein the scaling factor is based on a ratio of a bandwidth associated with encoding the second video unit to maximum bandwidth of a transmission channel. For example, the reward may be calculated based on Equations (3) and (4).

In some implementations, the reinforcement learning model is further trained by: determining an action associated with the encoding parameter based on the encoding state of the video encoder; determining an evaluation value for the encoding state for encoding the second video unit; determining a value loss based on the reward and the evaluation value; determining a policy loss based on the action; and updating the reinforcement learning model based on the value loss and the policy loss.

In some implementations, the agent comprises a neural network, wherein the neural network comprises: at least one input fully connected layer configured to extract features from the encoding state; at least one recurrent neural network coupled to receive the extracted features; and at least one output fully connected layer configure to decide an action for the agent.

In some implementations, the neural network is trained based on an actor-critic architecture, the actor configured to generate the action based on the encoding state and the critic configured to generate an evaluation value for the encoding state; and wherein the actor and the critic share a common portion of the neural network comprising the at least one input fully connected layer and the at least one recurrent neural network.

Some example implementations of the subject matter described herein are listed below.

In a first aspect, the subject matter described herein provides a computer-implemented method. The method comprises determining an encoding state of a video encoder, the encoding state being associated with encoding a first video unit by the video encoder; determining, by a reinforcement learning model and based on the encoding state of the video encoder, an encoding parameter associated with rate control in the video encoder; and encoding a second video unit different from the first video unit based on the encoding parameter.

In some implementations, determining the encoding parameter comprises: determining, by the reinforcement learning model, an action based on the encoding state of the video encoder; and mapping the action to the encoding parameter.

In some implementations, the second video unit is subsequent to the first video unit, and wherein the encoding state for encoding the first video unit comprises: a state representing an outcome for encoding at least the first video unit; a state of a buffer configured to buffer video units encoded by the video encoder before transmission; and a state associated with a status of a network for transmitting the encoded video units.

In some implementations, the outcome for encoding the first video unit comprises the encoding parameter of the encoded first video unit and a size of the encoded first video unit, the state of the buffer comprises the usage of the buffer, and the state associated with the status of the network comprises a target bits per pixel.

In some implementations, the usage of the buffer comprises at least one of: a ratio of an occupied space to maximum space of the buffer; and remaining space of the buffer measured in video units.

In some implementations, the reinforcement learning model is trained by: determining a reward for the encoding parameter based on the encoding of the second video unit, wherein the reward is configured to penalize buffer overshooting and to increase as the encoding parameter results in a higher visual quality.

In some implementations, the reward comprises: determining a base reward in such a way that the base reward has a negative value if buffer overshooting occurs and the base reward is proportional to the encoding parameter by a negative coefficient if the buffer overshooting does not occur; and scaling the base reward by a scaling factor to obtain the reward, wherein the scaling factor is based on a ratio of a bandwidth associated with encoding the second video unit to maximum bandwidth of a transmission channel.

In some implementations, the reinforcement learning model is further trained by: determining an action associated with the encoding parameter based on the encoding state of the video encoder; determining an evaluation value for the encoding state for encoding the second video unit; determining a value loss based on the reward and the evaluation value; determining a policy loss based on the action; and updating the reinforcement learning model based on the value loss and the policy loss.

In some implementations, the reinforcement learning model comprises a neural network of an agent, wherein the neural network comprises: at least one input fully connected layer configured to extract features from the encoding state; at least one recurrent neural network coupled to receive the extracted features; and at least one output fully connected layer configure to decide an action for the agent.

In some implementations, the neural network is trained based on an actor-critic architecture, the actor configured to generate the action based on the encoding state and the critic configured to generate an evaluation value for the encoding state; and wherein the actor and the critic share a common portion of the neural network comprising the at least one input fully connected layer and the at least one recurrent neural network.

In some implementations, the encoding parameter comprises at least one of a quantization parameter and a lambda parameter.

In some implementations, the video encoder is configured to encode screen content for real-time communication.

In a second aspect, the subject matter described herein provides an electronic device. The electronic device comprises a processing unit; and a memory coupled to the processing unit and having instructions stored thereon which, when executed by the processing unit, cause the electronic device to perform any of the steps of the above-mentioned method.

In a third aspect, the subject matter described herein provides a computer program product tangibly stored on a computer storage medium and comprising machine-executable instructions which, when executed by a device, cause the device to perform the method according to the aspect in the first aspect. The computer storage medium may be a non-transitory computer storage medium.

In a fourth aspect, the subject matter described herein provides a non-transitory computer storage medium having machine-executable instructions stored thereon, the machine-executable instruction, when executed by a device, causing the device to perform the method according to the aspect in the first aspect.

The functionalities described herein can be performed, at least in part, by one or more hardware logic components. For example, and without limitation, illustrative types of hardware logic components that can be used include Field-Programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of the subject matter described herein, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable sub-combination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

What is claimed is:

1. A computer-implemented method, comprising:
   determining an encoding state of a video encoder, the encoding state associated with encoding a first video unit by the video encoder;
   determining, by a reinforcement learning model and based on the encoding state of the video encoder, an encoding parameter associated with rate control for the video encoder;
   encoding a second video unit different from the first video unit based on the encoding parameter; and
   training the reinforcement learning model according to a reward for the encoding parameter based on the encoding of the second video unit, the reward being configured to penalize buffer overshooting and to increase as the encoding parameter results in a higher visual quality, wherein the reward is based on a base reward that:
   has a negative value if buffer overshooting occurs;
   increases as the encoding parameter decreases if buffer overshooting does not occur; and
   is scaled by a scaling factor to obtain the reward.

2. The method of claim 1, wherein determining the encoding parameter comprises:
   determining, by the reinforcement learning model, an action based on the encoding state of the video encoder; and
   mapping the action to the encoding parameter.

3. The method of claim 1, wherein the encoding state associated with the encoding the first video unit comprises:
   a state representing an outcome for encoding at least the first video unit;
   a state of a buffer configured to buffer video units encoded by the video encoder before transmission; and
   a state associated with a status of a network for transmitting the encoded video units.

4. The method of claim 3, wherein the outcome for encoding at least the first video unit comprises the encoding parameter from the encoding of the first video unit and a size of the encoded first video unit, the state of the buffer comprises the usage of the buffer, and the state associated with the status of the network comprises a target bits per pixel.

5. The method of claim 4, wherein the usage of the buffer comprises at least one of:
   a ratio of an occupied space to maximum space of the buffer; and
   remaining space of the buffer measured in video units.

6. The method of claim 1, wherein the scaling factor is based on a ratio of a bandwidth associated with the encoding the second video unit to maximum bandwidth of a transmission channel.

7. The method of claim 1, wherein the reinforcement learning model is trained by:
   determining an action associated with the encoding parameter based on the encoding state of the video encoder;
   determining an evaluation value for encoding state for the encoding the second video unit;
   determining a value loss based on the reward and the evaluation value;
   determining a policy loss based on the action; and
   updating the reinforcement learning model based on the value loss and the policy loss.

8. The method of claim 1, wherein the reinforcement learning model comprises a neural network of an agent, and wherein the neural network comprises:

at least one input fully connected layer configured to extract features from the encoding state;

at least one recurrent neural network coupled to receive the extracted features; and at least one output fully connected layer configured to decide an action for the agent.

9. The method of claim 8, wherein the neural network is trained based on an actor-critic architecture, the actor being configured to generate the action based on the encoding state, and the critic being configured to generate an evaluation value for the encoding state; and wherein the actor and the critic share a common portion of the neural network comprising the at least one input fully connected layer and the at least one recurrent neural network.

10. The method of claim 1, wherein the encoding parameter comprises at least one of a quantization parameter and a lambda parameter.

11. The method of claim 1, wherein the video encoder is configured to encode screen content for real-time communication.

12. A device comprising:
a processor; and
a memory having instructions stored thereon for execution by the processor, the instructions for causing, when executed by the processor, the device to perform acts including:
determining an encoding state of a video encoder, the encoding state associated with encoding a first video unit by the video encoder;
determining, by a reinforcement learning model and based on the encoding state of the video encoder, an encoding parameter associated with rate control in the video encoder, wherein the reinforcement learning model has been trained based on a reward for the encoding parameter, the reward being configured to penalize buffer overshooting and to increase as the encoding parameter results in a higher visual quality, and wherein the reward is based on a base reward that:
has a negative value if buffer overshooting occurs;
increases as the encoding parameter decreases if the buffer overshooting does not occur; and
is scaled by a scaling factor to obtain the reward; and
encoding a second video unit different from the first video unit based on the encoding parameter.

13. The device of claim 12, wherein the encoding state associated with the encoding the first video unit comprises:
a state representing an outcome for encoding at least the first video unit;
a state of a buffer configured to buffer video units encoded by the video encoder before transmission; and
a state associated with a status of a network for transmitting the encoded video units.

14. The device of claim 13, wherein the outcome for encoding at least the first video unit comprises the encoding parameter from the encoding of the first video unit and a size of the encoded first video unit, the state of the buffer comprises the usage of the buffer, and the state associated with the status of the network comprises a target bits per pixel.

15. The device of claim 12, wherein the scaling factor is based on a ratio of a bandwidth associated with encoding one or more video units to maximum bandwidth of a transmission channel.

16. The device of claim 14, wherein the reinforcement learning model comprises a neural network of an agent, and wherein the neural network comprises:
at least one input fully connected layer configured to extract features from the encoding state;
at least one recurrent neural network coupled to receive the extracted features; and
at least one output fully connected layer configure to decide an action for the agent.

17. The device of claim 12, wherein the video encoder is configured to encode screen content for real-time communication.

18. A computer-readable storage medium having program instructions stored thereon, the program instructions being executable by a processor to cause the processor to perform acts comprising:
determining an encoding state of a video encoder, the encoding state associated with encoding a first video unit by the video encoder,
determining, by a reinforcement learning model and based on the encoding state of the video encoder, an encoding parameter associated with rate control in the video encoder, wherein the reinforcement learning model has been trained based on a reward for the encoding parameter, the reward being configured to penalize buffer overshooting and to increase as the encoding parameter results in a higher visual quality, and wherein the reward is based on a base reward that:
has a negative value if buffer overshooting occurs;
increases as the encoding parameter decreases if the buffer overshooting does not occur; and
is scaled by a scaling factor to obtain the reward; and
encoding a second video unit different from the first video unit based on the encoding parameter.

19. The computer-readable storage medium of claim 18, wherein the encoding state associated with the encoding the first video unit comprises:
a state representing an outcome for encoding at least the first video unit;
a state of a buffer configured to buffer video units encoded by the video encoder before transmission; and
a state associated with a status of a network for transmitting the encoded video units.

20. The computer-readable storage medium of claim 19, wherein the outcome for encoding at least the first video unit comprises the encoding parameter from the encoding of the first video unit and a size of the encoded first video unit, the state of the buffer comprises the usage of the buffer, and the state associated with the status of the network comprises a target bits per pixel.

* * * * *